United States Patent Office 3,686,151
Patented Aug. 22, 1972

3,686,151
TERPOLYMERS OF DIALLYLAMINE
Gerald I. Keim, West Grove, Pa., assignor to
Hercules Incorporated, Wilmington, Del.
No Drawing. Filed Jan. 18, 1971, Ser. No. 107,473
Int. Cl. C08f 13/06
U.S. Cl. 260—79.3 A 7 Claims

ABSTRACT OF THE DISCLOSURE

Linear terpolymers of a diallylamine, sulfur dioxide and acrylamide or a lower alkyl substituted acrylamide are described. The terpolymers are produced by cyclopolymerizing a salt of the appropriate diallylamine in the presence of sulfur dioxide and the amide using a free radical catalyst. The terpolymers are useful as treating agents for paper and textiles and as intermediates for the formation of derivatives which are the resinous reaction products of the terpolymer with an epihalohydrin or an aldehyde.

---

This invention relates to linear terpolymers of a diallylamine and more particularly to linear terpolymers of a diallylamine, sulfur dioxide and an unsaturated amide.

It is known that the hydrochloride salts of diallylamine or N-methyldiallylamine can be cyclo-copolymerized with sulfur dioxide or with acrylamide using free radical initiators to yield linear, water-soluble copolymers. The copolymers with sulfur dioxide, however, are 1:1 copolymers, irrespective of the molar ratio of the amine and sulfur dioxide in the polymerization medium. The copolymers with acrylamide are cationic polymers which are useful demulsifying agents for oil-in-water emulsions. Additionally, those copolymers containing from 0.1 to 40 molar percent of the diallylamine can be used as intermediates for the preparation of thermosetting or potentially thermosetting resins.

Now in accordance with this invention it has been found that unique terpolymers can be produced by cyclo-polymerizing a diallylamine with sulfur dioxide and an ethylenically unsaturated amide and that the terpolymers so produced are useful as paper and textile resins, retention aids, water clarification resins and the like. The terpolymers also give derivatives which are useful in textile and paper applications and are particularly useful as finishes for cotton and cotton blends.

Accordingly, the present invention relates to a linear terpolymer consisting essentially of (a) about 15 to about 80 weight percent of units of a diallylamine of the formula $$\begin{array}{cc}
\text{CH}_2 \quad \text{CH}_2 & \text{CH}_2 \quad \text{CH}_2 \\
\parallel \quad\quad \parallel & \parallel \quad\quad \parallel \\
\text{R}-\text{C} \quad\quad \text{C}-\text{R} & \text{R}-\text{C} \quad\quad \text{C}-\text{R} \\
| \quad\quad | & | \quad\quad | \\
\text{CH}_2 \quad \text{CH}_2 \text{ or } & \text{CH}_2 \quad \text{CH}_2 \quad \text{X}^- \\
\diagdown \diagup & \diagdown \diagup \\
\text{N} & \text{N}^+ \\
| & \diagup \diagdown \\
\text{R}' & \text{R}' \quad \text{R}' \\
\text{(I)} & \text{(II)}
\end{array}$$

where R is hydrogen or lower alkyl, each R' is independently hydrogen, alkyl or a substituted alkyl group and X is an anion; (b) about 10 to about 30 weight percent of units of sulfur dioxide; and (c) from about 10 to about 55 weight percent of units of an unsaturated amide of the formula (III) $\quad\quad \text{CH}_2=\text{C}-\text{C}-\text{NH}_2$
$\quad\quad\quad\quad\quad\quad |\quad\,\parallel$
$\quad\quad\quad\quad\quad\quad \text{R}''\quad \text{O}$ where R'' is hydrogen or lower alkyl.

In the above Formulae I and II, each R can be the same or different and, as stated, can be hydrogen or lower alkyl. Suitable alkyl groups contain from 1 to 6 carbon atoms and are preferably methyl, ethyl, isopropyl or n-butyl. R' of Formulae I and II represents hydrogen, alkyl or substituted alkyl groups and each R' of Formula II can be alike or different. Typical alkyl groups, which R' can be, contain from 1 to 18 carbon atoms and preferably from 1 to 6 carbon atoms and include methyl, ethyl, propyl, isopropyl, butyl, tert-butyl, hexyl, octyl, decyl, dodecyl, tetradecyl, octadecyl and the like. The R' can also be a substituted alkyl group. Suitable substituents include, in general, any group which will not interfere with polymerization through a vinyl double bond. Typically, the substituents can be carboxylate, cyano, alkoxy, phenoxy, amino (primary, secondary or tertiary), amido, hydrazido, hydroxyl and the like. R'' of Formula III represents hydrogen or a lower alkyl group which suitably contains from 1 to 6 carbon atoms. Preferred alkyl groups which R'' can comprise are methyl, ethyl, isopropyl and n-butyl. The anion, X, is a salt forming anion of a mineral or organic acid and is preferably halide, sulfate, phosphate, nitrate, formate, acetate and the like.

The terpolymers of this invention are characterized by having the diallylamine component present as a cyclic unit which is a saturated 6-membered ring and having one of the following structures (IV) $\quad\quad\quad\quad\quad\quad\quad\quad$ (V)

$$\begin{array}{cc}
\text{R} \quad \text{CH}_2 \quad \text{R} & \text{R} \quad \text{CH}_2 \quad \text{R} \\
\diagdown \diagup \diagdown \diagup & \diagdown \diagup \diagdown \diagup \\
-\text{H}_2\text{C}-\text{C} \quad\quad \text{C}- & -\text{CR}_2-\text{C} \quad\quad \text{C}- \\
| \quad\quad | & | \quad\quad | \\
\text{H}_2\text{C} \quad \text{CH}_2 \text{ or } & \text{H}_2\text{C} \quad \text{CH}_2 \\
\diagdown \diagup & \diagdown \diagup \\
\text{N} & \text{N}^+\text{----X}^- \\
| & \diagup \diagdown \\
\text{R}' & \text{R}' \quad \text{R}'
\end{array}$$

the particular structure depending on whether the unit is in the free amine (IV) or salt form (V). R and R' have the same meaning as previously indicated with reference to Formulae I and II.

The terpolymers of this invention are produced by cyclo-polymerizing a salt of the appropriate diallylamine in the presence of the desired amount of sulfur dioxide and the unsaturated amide using a free radical catalyst. The cyclo-polymerization is preferably carried out in acetone and gives a terpolymer of the salt of the diallylamine. If desired, the polymer can then be neutralized with a base such as sodium hydroxide to give the free amine or base form.

Specific salts of the diallylamines which can be used to provide the terpolymers of the invention include diallylaminehydrochloride
N-methyldiallylamine hydrobromide
2,2'-dimethyl-N-methyldiallylamine hydrochloride
N-ethyldiallylamine hydrobromide
N-isopropyldiallylamine hydrochloride
N-n-butyldiallylamine hydrobromide
N-tert-butyldiallylamine hydrochloride
N-n-hexyldiallylamine hydrochloride
N-octadecyldiallylamine hydrochloride
N-acetamidodiallylamine hydrochloride
N-cyanomethyldiallylamine hydrochloride
N-β-propionamidodiallylamine hydrobromide
N-acetic ethyl ester substituted diallylamine hydrochloride
N-ethylmethylether substituted diallylamine hydrobromide
N-β-ethylaminediallylamine hydrochloride
N-hydroxyethyldiallylamine hydrobromide
N-aceto-hydrazide substituted diallylamine hydrochloride
diallyldimethylammonium chloride
diallyldiethylammonium chloride and the like as well as the corresponding sulfate, acetate, etc. salts thereof.

The unsaturated amide component of the terpolymer is acrylamide or a lower alkyl substituted acrylamide which is preferably methacrylamide, ethacrylamide or t-butacrylamide.

As stated above the terpolymer will contain by weight from about 15 to about 80 percent of the diallylamine, from about 10 to about 30 percent of sulfur dioxide and from about 10 to about 55 percent of the unsaturated amide. Preferably, the terpolymer will contain 30 to 60 percent of the diallylamine, 15 to 30 percent of sulfur dioxide and 15 to 55 percent of the unsaturated amide.

The following examples illustrate the preparation of the terpolymers of the invention. By the term "RSV" as used throughout is meant the reduced specific viscosity of the polymer as determined on a 0.1% solution of the polymer in aqueous 0.1 molar sodium chloride at 25° C., unless otherwise indicated. All percentages are by weight.

EXAMPLE 1

A terpolymer of N-methyldiallylamine hydrochloride, acrylamide and sulfur dioxide is prepared as follows. Into a reaction flask equipped with agitation and cooling means and containing 26.4 grams of N-methyldiallylamine hydrochloride, 12.4 grams of acrylamide and 340 grams of acetone is introduced a precooled solution of 11.2 grams of sulfur dioxide in 100 grams of acetone. The monomer mixture is cooled to about 20° C. after which 0.6 gram of tert-butyl hydroperoxide catalyst as a 5% solution in acetone is added dropwise to the monomer mixture over a period of 2 hours, cooling being employed to maintain the temperature at 23 to 28° C. during the catalyst addition, and the reaction mixture is stirred for an additional hour at 25 to 26° C. The white precipitate which formed is separated from the reaction medium, is thoroughly washed with methanol and then is dried overnight at 45–50° C. in a vacuum oven. The product (45 grams) is water-soluble, has an RSV of 0.35 and contains 43.6% of N-methyldiallylamine hydrochloride, 22.6% of $SO_2$ and 31.5% of acrylamide, indicating that the terpolymer is a 0.7:0.8:1.0 molar terpolymer.

EXAMPLE 2

The procedure of Example 1 is repeated except that the reaction flask, prior to introduction of the precooled solution of sulfur dioxide in acetone contains 26.4 grams of N-methyldiallylamine hydrochloride, 6.3 grams of acrylamide and 250 grams of acetone, 0.55 gram of catalyst is used and the reaction temperature is maintained at 25 to 32° C. during the catalyst addition. The product (35 grams) is water-soluble, has an RSV of 0.28 and contains 50.4% of N-methyldiallylamine hydrochloride, 25.8% of sulfur dioxide and 21.0% of acrylamide, indicating that the terpolymer is a 1.2:1.4:1.0 molar terpolymer.

EXAMPLE 3

Example 2 is repeated except that the reaction temperature is maintained at 24 to 33° C. during the catalyst addition. The product (29 grams) is water-soluble, has an RSV of 0.28 and contains 47.6% of N-methyldiallylamine hydrochloride, 26.2% of sulfur dioxide and 26.2% of acrylamide, indicating that the terpolymer is a 1.0:1.3:1.0 molar terpolymer.

EXAMPLE 4

The general procedure of Example 1 is repeated except that a terpolymer of diallylaminedimethylammonium chloride, sulfur dioxide and acrylamide is produced and the reaction flask prior to introduction of the precooled solution of sulfur dioxide in acetone contains 12.8 grams of diallylaminedimethylammonium chloride, 12.4 grams of acrylamide and 340 grams of acetone. The product (52 grams) is water soluble, has an RSV of 0.41 and contains 45.2% of diallylaminedimethylammonium chloride, 28.8% of sulfur dioxide and 26.2% of acrylamide, indicating that the terpolymer is a 1.0:1.6:1.3 molar terpolymer.

EXAMPLE 5

The procedure of Example 4 is repeated except that the reaction flask prior to introduction of the precooled solution of sulfur dioxide in acetone contains 28.8 grams of diallylaminedimethylammonium chloride, 6.2 grams of acrylamide and 250 grams of acetone, 0.55 gram of catalyst is used and the reaction temperature is maintained at 26 to 33° C. during the catalyst addition. The product (45 grams) is water-soluble, has an RSV of 0.38 and contains 53.0% of diallylaminedimethylammonium chloride, 18.5% of sulfur dioxide and 28.5% of acrylamide, indicating that the terpolymer is a 1.4:1.6:1.0 molar terpolymer.

EXAMPLE 6

The procedure of Example 4 is repeated except that the reaction flask prior to introduction of the precooled solution of sulfur dioxide in acetone contains 28.8 grams of diallylaminedimethylammonium chloride, 3.2 grams of acrylamide and 205 grams of acetone, 0.49 gram of catalyst is used and the reaction temperature is maintained at 25 to 35° C. during the catalyst addition. The product (41 grams) is water soluble, has an RSV of 0.36 and contains 56.7% of diallylaminedimethylammonium chloride, 20.8% of sulfur dioxide and 22.5% of acrylamide, indicating that the terpolymer is a 2.0:2.0:1.0 molar terpolymer.

EXAMPLE 7

A terpolymer of diallylamine hydrochloride, acrylamide and sulfur dioxide is prepared as follows. Into a reaction flask equipped with agitator and cooling means and containing 23.8 grams of diallylamine hydrochloride, 12.3 grams of acrylamide and 336 grams of acetone is introduced a solution of 11.2 grams of sulfur dioxide in 79 grams of acetone. The monomer mixture is cooled to about 26° C. after which 0.52 cc. of 89.9% of tert-butyl hydroperoxide dissolved in 9.4 grams of acetone is added portionwise to the mixture over a period of 6 minutes, cooling being employed to maintain the temperature at 26 to 33° C. during the catalyst addition, and the reaction mixture is stirred for an additional hour at 26 to 33° C. The product, after recovering, washing and drying in the manner of Example 1, gives 23.5 grams of a terpolymer having an RSV of 0.1 (determined on a 0.1% solution of the terpolymer in 1 molar sodium chloride at 25° C.) and containing 38.7% of diallylamine hydrochloride, 23.5% of sulfur dioxide and 29.9% of acrylamide, indicating that the terpolymer is a 1.0:1.3:1.4 molar terpolymer.

EXAMPLE 8

A terpolymer of N-methyldiallylamine hydrochloride, methacrylamide and sulfur dioxide is prepared as follows. Into a reaction flask equipped with agitator and cooling means and containing 64.6 grams of N-methyldiallylamine hydrochloride, 34 grams of methacrylamide and 94 grams of water is bubbled 8.5 grams of sulfur dioxide. The mixture is cooled to about 30° C. after which 1.24 grams of ammonium persulfate catalyst dissolved in 10 grams of water is added dropwise, 17.1 grams of sulfur dioxide is bubbled into the mixture and an additional 1.24 grams of ammonium persulfate catalyst dissolved in 20 grams of water is added dropwise. The resulting mixture is stirred for 3 hours at 30° C. after which time a viscous solution is obtained. Polymer is precipitated from the solution by dumping the solution into a large excess of methanol (about 1000 grams) and the white precipitate which forms is filtered off, is thoroughly washed with methanol and then is dried at 50° C. in a vacuum oven for 6 hours. The product is a white powder which is water-soluble, has an RSV of 0.05 and contains 30.7% of N-methyldiallylamine hydrochloride, 19.7% of sulfur dioxide and 49.2% of methacrylamide, indicating that the terpolymer is a 1:1.5:3 molar terpolymer.

EXAMPLE 9

The procedure of Example 2 is repeated except that the precooled solution of sulfur dioxide in acetone contains 5.6 grams of sulfur dioxide and 45 grams of acetone, and 0.38 part of catalyst and a total of 345 grams of acetone are used. The product (27.5 grams) is water-soluble, has an RSV of 0.13 and contains 60.0% of N-methyldiallylamine hydrochloride, 22.6% of sulfur dioxide and 17.4% of acrylamide, indicating that the terpolymer is a 1.6:1.4:1.0 molar terpolymer.

EXAMPLE 10

The procedure of Example 9 is repeated except that the reaction flask, prior to introduction of the precooled solution of sulfur dioxide in acetone contains 13.2 grams of N-methyldiallylamine hydrochloride, 6.3 grams of acrylamide and 181 grams of acetone, 0.25 gram of catalyst is used and the reaction temperature is maintained at 25 to 30° C. during the catalyst addition. The product (7 grams) is water-soluble, has an RSV of 0.12 and contains 28.6% of N-methyldiallylamine hydrochloride, 20.0% of sulfur dioxide and 51.4% of acrylamide, indicating that the terpolymer is a 1.0:1.6:3.7 molar terpolymer.

The terpolymers of this invention are useful as resinous finishing agents for fibers, thickening agents for printing inks, printing paste stabilizers, adhesives, water-soluble paints, treating agents for paper, cationizing agents for starches, dye modifiers for polymers, retention aids, high molecular weight cationic surfactants, flocculants, water clarifiers and the like, and are particularly useful as intermediates for the formation of derivatives which are the resinous reaction products of the terpolymer with an epihalohydrin or an aldehyde. Outstanding are the epichlorohydrin and formaldehyde resinous reaction products. These products can be applied to dyed fabrics of nylon, polyester, polypropylene, cotton and cotton-polyester blends to provide antistatic and soil-release finishes having good to excellent wash retention. Additionally, treated fabrics of polypropylene show improved dyeability and printability over nontreated fabrics and can be readily dyed in light and medium shades having good wash fastness using anthraquinone based acid dyestuffs, disperse dyestuffs and fiber-reactive dyestuffs.

The resinous reaction products of the terpolymers of the invention with an epihalohydrin can be prepared by reacting the terpolymer with from about 0.5 mole to about 2.0 moles and preferably about 1 mole to about 1.5 moles of any epihalohydrin, i.e., epichlorohydrin, epibromohydrin, epifluorohydrin or epiiodohydrin per mole of secondary plus tertiary amine present in the terpolymer at a temperature of from about 30° C. to about 80° C. and preferably from about 40° C. to about 60° C. until the viscosity measured on a solution containing 20% to 30% solids at 25° C. has reached a range of A to H and preferably about C to D on the Gardner-Holdt scale. The reaction is preferably carried out in aqueous solution to moderate the reaction, and at a pH of from about 7 to about 9.5. When the desired viscosity is reached, sufficient water is added to adjust the solids content of the resin solution to about 15% or less and the product cooled to room temperature (about 25° C.). The resin solution can be used as such or, if desired, can be adjusted to a pH of at least about 6 and preferably to a pH of about 5 and then used. Any suitable acid such as hydrochloric, sulfuric, nitric, formic, phosphoric and acetic acid can be used to adjust the pH.

The resinous reaction products of the terpolymers of the invention with an aldehyde can be prepared by reacting the terpolymer with from about 0.25 to about 2.0 moles and preferably about 0.5 to about 1.0 mole of an aldehyde such as formaldehyde, glyoxal, and the like per mole of unsaturated amide at a pH above 7 and preferably 7.5 to 8.5. The reaction is preferably carried out at about 25 to about 30° C. in aqueous medium.

Preparation of reaction products of the terpolymer of this invention with epichlorohydrin or formaldehyde are illustrated by the following examples.

EXAMPLE 11

A reaction product of the terpolymer of N-methyldiallylamine hydrochloride, $SO_2$ and acrylamide with epichlorohydrin is prepared as follows.

A reaction vessel equipped with a condenser, mechanical stirrer and thermometer is charged with a solution of 34 grams of the terpolymer prepared in Example 2 in 75 grams of water. The pH of the solution is adjusted to 7.5 with one molar sodium hydroxide (about 64 grams) and then 16.1 grams of epichlorohydrin is added to the vessel and 12.9 grams of water is introduced to give a reaction medium of 25% solids. The contents of the flask are heated to 35° C. and the reaction is monitored by determining the viscosity of a 25° solids solution at 35° C. using Gardner-Holdt viscosity tubes. Within 17 minutes the viscosity has reached E+ and the reaction is terminated by adding 10 grams of one molar hydrochloric acid and 195 grams of water. The resin solution contains 12.1% total solids. Additional amounts of one molar hydrochloric acid are added periodically to maintain the pH at 2.8.

EXAMPLE 12

The procedure of Example 11 is repeated except that in this example the vessel is charged with a solution of 26.3 grams of the terpolymer prepared in Example 3 in 60 grams of water, 12.0 grams of epichlorohydrin is added, 4.7 grams of water is used to give a reaction medium of 25% solids, the reaction medium is heated to 25–30° C., and the reaction is terminated at a Gardner-Holdt viscosity of H by adding 20 grams of one molar hydrochloric acid and 473 grams of water, an additional 15 grams of one molar hydrochloric acid being required to bring the pH to 1.5. The resin solution contains 5.05% total solids. Additional amounts of one molar hydrochloric acid are added periodically to maintain the pH at 2.0.

EXAMPLE 13

A reaction product of the terpolymer of diallylamine-dimethylammonium chloride, sulfur dioxide and acrylamide prepared in Example 6 and formaldehyde is prepared as follows.

A reaction vessel equipped with a condenser, mechanical stirrer and thermometer is charged with 20 grams of the terpolymer of Example 6 dissolved in 50 grams of water. A solution of 5.38 grams of paraformaldehyde dissolved in 50 grams of water containing 23 grams of 5% aqueous sodium hydroxide is added to the vessel and 36 grams of water is introduced to give a reaction medium of 10.9% terpolymer concentration. The reaction vessel is sealed and the vessel contents are stirred at room temperature for 16.5 hours, after which time the vessel is opened and the contents are removed. Analysis of the resin solution product indicates that the formaldehyde derivative is formed, and that 59% of the acrylamide units are methylolated, the terpolymer containing 10.7% of methylolated acrylamide.

As stated above, the reaction products of the terpolymers of the invention with an epihalohydrin or an aldehyde are particularly useful in textile applications and provide soil release, antistatic properties and improved acid dyeability to textiles treated therewith. The reaction products are preferably applied to the textile or fabric as aqueous resin solutions by padding or spraying techniques. Thus, for example, dried fabric can be impregnated by dipping the fabric twice in a padding liquor containing the aqueous solution of the resin using one or more passes through a conventional padding machine and sufficient roll pressure to secure the desired pick-up, usually about 65 to 72% wet pick-up. The wetted fabric can then be heated for about 0.5 minute to about 5 minutes at 120° to 250° C. or higher to dry the fabric and cure the resin to a water-insoluble condition. Generally, from about 1 to about 5% by weight based on the dry weight of the fabric of the cured resin will be sufficient to provide soil release finishes. The padding liquor usually will also contain additives such as crease-proofing resins and wetting agents. Other additives such as lubricants, softening agents, antistatic agents and the like can also be present in the padding liquor.

The following examples illustrate the use of the resins prepared in Examples 11, 12 and 13 as textile additives.

EXAMPLES 14–17

A first pad liquor (A) is prepared by diluting 100 grams of the resin solution prepared in Example 11 with 50 grams of water containing 1.2 grams of sodium hydroxide and then adding 75 grams of a commercial crease-proofing resin solution (Hylite, manufactured by Proctor Chemical Company) and 1.5 grams of a 25% aqueous solution of a non-ionic wetting agent (Igepal CO630 manufactured by General Aniline and Film Company). The pH of the above solution is next adjusted to 5.5 with 5 to 6 molar hydrochloric acid followed by 50% aqueous acetic acid, and then 75 grams of water and 15 grams of a 50% aqueous solution of magnesium chloride hexahydrate catalyst is added, giving a total volume of 300 ml. of pad liquor "A."

A second pad liquor (B) is prepared by diluting 62.5 grams of the resin solution prepared in Example 13 with 100 grams of a crease-proofing resin solution (Hylite) and 2 grams of a 25% solution of a non-ionic wetting agent (Igepal CO630), adding 20 grams of a 50% aqueous solution of magnesium chloride hexahydrate catalyst and then 316 grams of water to give a total volume of 500 ml. of pad liquor and finally adjusting the pH of the liquor so produced to 5.0 to 5.5 with 50% aqueous acetic acid.

Samples (24 x 18 cm., weighing 5–8 grams each), in triplicate, of cotton (bleached and mercerized combed broadcloth, 136 x 64 count and weighing 3 oz./sq. yd.) and of cotton blend (65% polyester–35% cotton blend broadcloth, Kodel Type IV, 120 x 70 count and weighing 3 oz./sq. yd.) are treated with either pad liquor A or B by dipping the sample in the pad liquor using 2 passes through a 3 roll "Butterworth" padding machine and sufficient pressure to obtain about 65 to 72% wet pick-up. The padded samples are next dried for 90 seconds at 250° F. and cured at 350° F. for 90 seconds in an oven, following which the cured samples are conditioned at constant 50% humidity and weighed. The samples are next washed once in a standard AATCC washing machine using a 12 minute wash cycle at 120° F. and 8 oz. of AATCC standard detergent No. 124, are dried in a standard AATCC dryer using a 15 minute drying cycle, and then are conditioned at constant 50% humidity and reweighed. Control samples are also treated in the same manner except that the pad liquors contain only the crease-proofing resin, wetting agent and magnesium chloride catalyst, no resin solution of Example 11 or 13 being present.

The samples (after curing, washing and drying) are tested for soiling by placing the sample to be tested on a 12" x 12" flat sheet of Teflon and applying to the top surface of the sample two small drops (0.04 to 0.06 gram) of dirty spent motor crank case oil (mineral oil) or two small drops (0.06 to 0.08 gram) of commercial Wesson oil containing in suspension 0.03% of red iron oxide (Jewelers Rouge) in the configuration of separate spots having 6 inches between centers. Each spot is immediately covered with a 3" x 3" piece of glassine paper, topped with a 2" x 2" piece of manila cardboard, and then weighted with a 500 gram weight for 15 seconds, after which time the weight, cardboard and paper are removed and the stained sample is aged for one hour at room temperature. The stained samples are next washed and dried (as previously) and the oily stain residue is evaluated according to AATCC test method 130–169 using Deering-Milliken standards. A 5-step scale rating is used, a rating of 5 representing the best stain removal and a rating of 1 the poorest stain removal. Details as to the amount of resin retained and soiling test results are tabulated below in Table I, the values given being the average of triplicate runs.

TABLE I.—RESIN APPLICATION AND SOIL RELEASE DATA

| Example No. | Fabric | Cured resin applied (percent) [1] | | | Percent of total resin retained after washing | Soil release rating | |
|---|---|---|---|---|---|---|---|
| | | A | B | Total | | Dirty motor oil | Dirty Wesson oil |
| Control | Cotton | | | [2] 5 | 75–78 | 1 | 1+ |
| 14 | do | 2.5–3.0 | | 7.4–7.8 | 86–89 | 2–3 | 3–4 |
| 15 | do | | 1.0–1.6 | 6.4–6.5 | 76–80 | 2–3 | 3–4 |
| Control | Blend | | | [2] 4 | 75–78 | 1– | 1 |
| 16 | do | 2.5–3.0 | | 7.8–8.1 | 77–83 | 1–2 | 3+ |
| 17 | do | | 1.0–1.6 | 6.2–6.7 | 59–61 | 2 | 3–4 |

[1] A denotes the resin of Example 11, applied as pad liquor A; B denotes the resin of Example 13, applied as pad liquor B.
[2] Crease-proofing resin only.

EXAMPLE 18

Samples (18 x 24 cm., weighing 7 grams each), in triplicate, of loosely woven fabric (42 x 40 count, weighing 3.5 oz./sq. yd.) from 1½" staple polypropylene fiber are dipped twice using a 15 second immersion period for each dip into the resin solution prepared in Example 12 and then are passed twice through a 3 roll "Butterworth" padding machine at a pressure adjusted to provide 100% wet pickup. The padded samples are dried for 90 seconds at 250° F. and cured at 350° F. for 90 seconds in an oven, removed from the oven, cooled and weighed at 50% relative humidity. The dried pick-up weight is about 0.3 gram, representing about 5% by weight of the fabric. The fabrics are next machine washed and dried according to the procedure of Examples 14 to 17 and reweighed. No loss in weight has occurred.

Swatches of the treated samples are tested for dyeing characteristics by dyeing with 1% by weight of the fiber of an acid dyestuff, fiber reactive dyestuff and disperse dyestuff and compared with a control (fabric sample which has not been resin treated) dyed in the same manner. Details on the dyeings and the results obtained are set forth below.

Acid dyestuff

Swatches are dyed according to standard acid dyeing procedures [See Schmidlin, Preparation and Dyeing of Synethetic Fibers, Reinhold (1963), p. 232] at the boil for 1 hour using acid Green 25. A medium green shade is obtained on the swatches of this example and a pale green shade on the control. The swatches are next scoured with hot water at a pH of 8–9 for 15 minutes at 65–70° C., rinsed well and then re-evaluated. The swatches of the example are a light to medium green shade and the control has lost all of its color.

Fiber reactive dyestuff

The swatches are dyed according to standard disperse dyeing procedures [See Schmidlin, Preparation and Dyeing of Synthetic Fibers, Reinhold (1963) pp. 258–259] at the boil for 1 hour using Reactive Red 10 (Procinyl Scarlet GS). A medium scarlet shade is obtained on the swatches of the example whereas the control is only slightly stained. After scouring with hot water at a pH of 8–9 for 15 minutes at 65–70° C. and rinsing, the swatches of the example are a light to medium scarlet shade and the control has lost all of its color.

and of cotton blend (65% polyester-35% cotton blend broadcloth, Kodel Type IV, 120 x 70 count and weighing 3 oz./sq. yd.) are treated with either pad liquor C or D, cured, washed, dried and then soiled, washed, dried and evaluated, as in Examples 14 to 17. The samples are next washed and dried, 4 times (as previously), resoiled with the dirty spent motor oil and Wesson oil, washed and dried and re-evaluated for staining (as previously). Details as to the amount of resin retained, and soiling test results are tabulated below in Table II, the values being the average of triplicate runs.

TABLE II

| Example No. | Fabric | Cured Resin Applied (percent)[1] | | | Percent of total resin retained after washing | | Soil release rating | | | |
|---|---|---|---|---|---|---|---|---|---|---|
| | | | | | | | Dirty motor oil | | Dirty Wesson oil | |
| | | C | D | Total | 1 wash | 5 washes | 1 wash | 5 washes | 1 wash | 5 washes |
| Control | Cotton | | | [2]5 | 76 | | 1 | | 1+ | |
| 19 | do | 5.0–5.4 | | 12–13 | 57 | 37 | 2–3 | 2–3 | 3–4 | 4 |
| 20 | do | | 5.0–5.4 | 12–13 | 59 | 37 | 2–3 | 3– | 3–4 | 4 |
| Control | Blend | | | [2]4 | 76 | | 1– | | 1 | |
| 21 | do | 6.2–6.6 | | 15–16 | 54 | 36 | 2–3 | 2 | 3–4 | 3–4 |
| 22 | do | | 6.2–6.6 | 15–16 | 49 | 35 | 2–3 | 2 | 3–4 | 3–4 |

[1] C denotes the terpolymer of Example 9, applied as pad liquor C; D denotes the terpolymer of Example 10, applied as pad liquor D.
[2] Crease-proofing resin only.

Disperse dyestuff

Swatches are dyed according to the method used above for the fiber reactive dyestuff using Disperse Red 60. Swatches of the example are a medium to deep shade of red and the control is a light red. Scouring did not alter the color of the swatches of the example or control.

Swatches of the treated samples are also evaluated for antistatic properties using static decay measurements and surface resistivity, and compared with untreated fabric. In the static decay test the voltage dissipation by a conditioned fabric is measured as a function of time at 50% relative humidity. Surface resistivity is determined according to ASTM D-257 using swatches conditioned for 1 day at 50% relative humidity, the resistivity being calculated as a function of amperage after a time interval of 1 minute. Details of the antistatic evaluations are tabulated below.

| | Substrate | |
|---|---|---|
| | Treated swatch | Control swatch |
| Static decay test voltage reading: | | |
| Initial (start) | 10,000 | 10,000 |
| 2 minutes | 650 | 950 |
| 4 minutes | 440 | 945 |
| 6 minutes | 310 | 940 |
| 8 minutes | 225 | 937 |
| 10 minutes | 160 | 930 |
| Surface resistivity: | | |
| Voltage | 940 | 940 |
| Amperage at 1 min | $0.0615 \times 10^{-10}$ | $0.0021 \times 10^{-10}$ |
| Resistivity (ohms) at 1 min | $8.16 \times 10^{15}$ | $2.39 \times 10^{17}$ |

The following examples illustrate the use of the terpolymer prepared in Examples 9 and 10 as soil release agents.

EXAMPLES 19–22

A pad liquor base is prepared diluting 80 grams of a commercial crease-proofing resin solution (Hylite) and 2 grams of a 25% aqueous solution of a non-ionic wetting agent (Igepal CO 630) with 400 parts of water.

Two pad liquors, identified as C and D, are next prepared by dissolving 4.4 grams of the terpolymer of Example 9 (pad liquor C) or Example 10 (pad liquor D) in a ¼ portion of the above base, adjusting the pH of the solution to 6.5–7 with 10% aqueous sodium hydroxide and then adding 7.5 parts of a 50% aqueous solution of magnesium chloride hexahydrate catalyst. The pH of the pad liquors at this point is 5.5–6.

Samples (12 x 9 cm., weighing 3–3.6 grams each), in triplicate, of cotton (bleached and mercerized combed broadcloth, 136 x 64 count and weighing 3 oz./sq. yd.)

As can be seen by the above performance data, the terpolymers of the invention show an excellent overall balance of soil release properties. Additionally, the terpolymers of the invention have good to excellent thermal stability and find utility in a broad range of applications, and particularly those requiring high curing temperatures. The terpolymers of Examples 9 and 10 show the following volatility characteristics by thermogravimetric analyses run in nitrogen at a heating rate of 10° C. per minute.

TABLE III

| Temperature, ° C. | Terpolymer of Example 9 | Terpolymer of Example 10 |
|---|---|---|
| 50 | 1 | 1 |
| 100 | 4 | 5 |
| 150 | 5 | 5 |
| 200 | 7 | 6 |
| 225 | 7 | 8 |
| 250 | 18 | 19 |
| 275 | 36 | 34 |
| 300 | 44 | 39 |
| 350 | 50 | 45 |
| 400 | 60 | 55 |

What I claim and desire to protect by Letters Patent is:

1. A linear terpolymer consisting essentially of, by weight, (a) about 15 to about 80% of units of a diallylamine of the formula

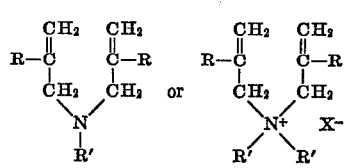

where R is hydrogen or lower alkyl, each R' is independently hydrogen, alkyl or a substituted alkyl group and X is a salt-forming anion of a mineral or organic acid; (b) about 10 to about 30% of units of sulfur dioxide; and (c) from about 10 to about 55% of units of an unsaturated amide of the formula

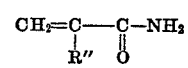

where R" is hydrogen or lower alkyl.

2. The terpolymer of claim 1 wherein the amide is acrylamide.

3. The terpolymer of claim 2 wherein the diallylamine is N-methyldiallylamine hydrochloride.

4. The terpolymer of claim 2 wherein the diallylamine is diallylaminedimethylammonium chloride.

5. The terpolymer of claim 2 wherein the diallylamine is diallylamine hydrochloride.

6. The terpolymer of claim 1 wherein the amide is methacrylamide.

7. The terpolymer of claim 6 wherein the diallylamine is N-methyldiallylamine hydrochloride.

References Cited

UNITED STATES PATENTS 3,375,233   3/1968   Harada _____ 260—79.3 A

JOSEPH L. SCHOFER, Primary Examiner

C. A. HENDERSON, Jr., Assistant Examiner

U.S. Cl. X.R.

106—20; 117—39, 122 R, 139.5 A; 161—82; 210—54